United States Patent
Jang et al.

(10) Patent No.: US 9,637,583 B2
(45) Date of Patent: May 2, 2017

(54) TRANSPARENT ABS RESIN AND TRANSPARENT ABS RESIN COMPOSITION

(71) Applicant: LG CHEM, LTD., Seoul (KR)

(72) Inventors: Seok Goo Jang, Daejeon (KR); Sang Hoo Park, Daejeon (KR); Roo Da Lee, Daejeon (KR); Won Seok Lee, Daejeon (KR); Jeong Su Choi, Daejeon (KR); Jeun Hoon Yoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/771,187

(22) PCT Filed: Aug. 21, 2014

(86) PCT No.: PCT/KR2014/007745
§ 371 (c)(1),
(2) Date: Aug. 27, 2015

(87) PCT Pub. No.: WO2015/030415
PCT Pub. Date: Mar. 5, 2015

(65) Prior Publication Data
US 2016/0215083 A1 Jul. 28, 2016

(30) Foreign Application Priority Data

Aug. 29, 2013 (KR) .................. 10-2013-0102811
Aug. 18, 2014 (KR) .................. 10-2014-0106707

(51) Int. Cl.
*C08F 279/04* (2006.01)
*C08L 33/20* (2006.01)
*C08L 55/02* (2006.01)

(52) U.S. Cl.
CPC ............ *C08F 279/04* (2013.01); *C08L 33/20* (2013.01); *C08L 55/02* (2013.01); *C08L 2201/10* (2013.01)

(58) Field of Classification Search
None
See application file for complete search history.

(56) References Cited

U.S. PATENT DOCUMENTS 7,393,891 B2 * 7/2008 O .................. C08F 257/02
523/201
2006/0041062 A1 2/2006 Choi et al.

FOREIGN PATENT DOCUMENTS

| CN | 1860175 A | 8/2006 |
|---|---|---|
| EP | 2404941 A1 * | 1/2012 |
| KR | 10-0360987 B1 | 11/2002 |
| KR | 10-2003-0009856 A | 2/2003 |
| KR | 10-0423873 B1 | 3/2004 |
| KR | 10-2006-0016853 A | 2/2006 |
| KR | 10-2007-0064925 A | 6/2007 |
| KR | 10-2012-0004261 A | 1/2012 |
| KR | 10-2012-0040771 A | 4/2012 |

OTHER PUBLICATIONS

International Search Report for PCT/KR2014/007745 filed on Aug. 21, 2014.
Office Action for Chinese Patent Application No. 201480013412.7 dated May 27, 2016.

* cited by examiner

*Primary Examiner* — Irina S Zemel
*Assistant Examiner* — Jeffrey Lenihan

(57) ABSTRACT

The present invention provides a transparent acrylonitrile-butadiene-styrene (ABS) resin and a transparent ABS resin composition. Specifically, according to the present invention, a transparent ABS resin and a transparent ABS resin composition, which have excellent transparency and impact resistance, can be provided by minimizing the degree of impregnation of a styrene monomer into a polybutadiene rubber latex while allowing the styrene monomer to constitute a graft shell to thereby effectively form the graft shell. Particularly, according to the present invention, a transparent ABS resin composition having high transparency and impact resistance can be provided, despite applying a reducing agent and Fe ions, which adversely affected the transparency of ABS resin in the prior art, to ABS resin.

20 Claims, No Drawings

TRANSPARENT ABS RESIN AND TRANSPARENT ABS RESIN COMPOSITION

CROSS-REFERENCE TO RELATED APPLICATIONS

The present application is a National Stage of International Patent Application No. PCT/KR2014/007745 filed on Aug. 21, 2014, which claims priority to Korean Patent Application No. KR 10-2013-0102811 filed on Aug. 29, 2013, and No. KR 10-2014-0106707 filed on, Aug. 18, 2014, the disclosures of which are hereby incorporated in their entirety by reference.

TECHNICAL FIELD

The present invention relates to a transparent acrylonitrile-butadiene-styrene (ABS) resin and a transparent ABS resin composition, and more particularly, to a transparent ABS resin and a transparent ABS resin composition, which have excellent transparency and impact resistance as a result of minimizing the degree of impregnation of a styrene monomer into a polybutadiene rubber latex while allowing the styrene monomer to constitute a graft shell to thereby effectively form the graft shell.

BACKGROUND ART

In recent years, industrial advancement and great product differentiation have brought about a great deal of variation in product design. Color diversification and transparent designs have attracted considerable attention. Variation in designs requires variation in raw materials. As a result, a great deal of research into transparent materials is actively underway.

For this reason, many techniques of imparting transparency to an acrylonitrile-butadiene-styrene (ABS) resin having excellent impact resistance, chemical resistance, processability and the like by incorporating acrylic acid alkyl ester or methacrylic acid alkyl ester monomers in the ABS resin have been developed (Korean Patent Nos. 0360987 and 0423873).

In an example of the techniques, a transparent resin is prepared by graft-copolymerizing conjugated diene rubber with methyl methacrylate-styrene-acrylonitrile. However, transparent resins containing conjugated diene rubber have limited transparency. Specifically, when the rubber content of these transparent resins is as low as 5% or less, the resins have excellent transparency, but when the rubber content of the resins is more than 5%, the resins have poor transparency, and thus have a haze value higher than that of polycarbonate (PC) or polymethylmethacrylate (PMMA).

Furthermore, these resins have a poor color, and for this reason, the color thereof is adjusted using a colorant during an extrusion or injection molding process. Nevertheless, these resins do not have a color close to natural color, and thus use thereof is limited.

Meanwhile, to achieve a high degree of conversion of monomers at low reaction temperature, a redox system is mainly used during polymerization. To form the redox system, the following three methods are typically used: a method of adding a colloidal dispersion of $Fe^{2+}$; a method of adding reducing sugar (fructose, etc.); and a method of using sodium formaldehyde sulfoxylate (SFS).

Among these methods, sodium formaldehyde sulfoxylate (SFS) is mainly used because it enables reduction in the amount of iron (Fe) ions compared to other systems.

For reference, if Fe ions remain in a product, they will discolor the product and reduce the thermal stability of the product. If Fe ions are not used during polymerization for this reason, the degree of conversion of monomers will be significantly reduced, and thus the yield of the product will be reduced and the content of residual monomers in the product will also increase, adversely affecting the physical properties of the product.

DISCLOSURE

Technical Problem

Therefore, the present invention has been made in view of the above-described problems in the prior art, and it is one object of the present invention to provide a transparent acrylonitrile-butadiene-styrene (ABS) resin and a transparent ABS resin composition, which have excellent transparency and impact resistance as a result of minimizing the degree of impregnation of a styrene monomer into a polybutadiene rubber latex while allowing the styrene monomer to constitute a graft shell to thereby effectively form the graft shell.

Technical Solution

In accordance with one aspect of the present invention, provided is a transparent acrylonitrile-butadiene-styrene (ABS) resin comprising: 50-60 wt % of a polybutadiene rubber latex; and 50-40 wt % of the sum of a methyl methacrylate monomer, a styrene monomer and an acrylonitrile monomer, wherein the degree of impregnation of the styrene monomer into the polybutadiene rubber latex is 0.005 or less.

In accordance with another aspect of the present invention, provided is a method for preparing a transparent acrylonitrile-butadiene-styrene (ABS) resin, the method comprising the steps of: (1) introducing a butadiene monomer in portions to prepare a polybutadiene rubber latex having a gel content of 85-94%; and (2) continuously adding 50-40 wt % of the sum of a methyl methacrylate monomer, a styrene monomer and an acrylonitrile to 50-60 wt % of the polybutadiene rubber latex, and, at the same time, graft-polymerizing the monomers in the presence of a reactive emulsifier and an oil-soluble polymerization initiator to prepare the transparent ABS resin.

In accordance with still another aspect of the present invention, provided is a transparent acrylonitrile-butadiene-styrene (ABS) resin composition comprising: a transparent ABS resin; and a styrene-acrylonitrile (SAN) or methyl methacrylate-styrene-acrylonitrile (MSAN) resin, wherein the transparent ABS resin comprises 50-60 wt % of a polybutadiene rubber latex and 50-40 wt % of the sum of a methyl methacrylate monomer, a styrene monomer and an acrylonitrile monomer, wherein the degree of impregnation of the styrene monomer into the polybutadiene rubber latex is 0.005 or less.

In accordance with yet another aspect of the present invention, provided is a transparent thermoplastic resin which is prepared by extruding and injection-molding the above-described transparent ABS resin composition and has a light transmittance of 90.5 or higher as measured on a 3 mm thick sheet at room temperature in accordance with ASTM D1003, a haze value of 2.0 or less as measured on a 3 mm thick sheet at room temperature in accordance with ASTM D1003, and an Izod impact strength of 15 or higher as measured in accordance with ASTM D256 (¼").

Hereinafter, the transparent ABS resin according to the present invention will be described, and then a transparent ABS resin composition and a transparent thermoplastic resin, which comprise the transparent ABS resin, will also be described in detail.

The present invention is technically characterized in that it provides a transparent acrylonitrile-butadiene-styrene (ABS) resin comprising: 50-60 wt % of a polybutadiene rubber latex; and 50-40 wt % of the sum of a methyl methacrylate monomer, a styrene monomer and an acrylonitrile monomer, wherein the degree of impregnation of the styrene monomer into the polybutadiene rubber latex is 0.005 or less.

As used herein, the expression "degree of impregnation of a styrene monomer into polybutadiene rubber latex", unless otherwise specified, refers to the difference in refractive index between polybutadiene rubber latex and a graft copolymer prepared by grafting a methyl methacrylate monomer, a styrene monomer and an acrylonitrile monomer onto the polybutadiene rubber latex.

For reference, the refractive index of the graft copolymer can be calculated using the following equation:

$$WtA \times RIA + WtS \times RIS + WtM \times RIM$$

wherein WtA represents the weight percent (wt %) of a vinyl cyan compound; RIA represents the refractive index of the vinyl cyan compound; WtS represents the wt % of an aromatic vinyl compound; RIS represents the refractive index of the aromatic vinyl compound; WtM represents the wt % of a methacrylic acid alkyl ester or acrylic acid alkyl ester compound; and RIM represents the refractive index of the methacrylic acid alkyl ester or acrylic acid alkyl ester compound.

In a specific embodiment of the present invention, the degree of impregnation of the styrene monomer into the polybutadiene rubber latex in the transparent resin of the present invention may be 0.005 or less or 0-0.005.

Specifically, the gel content of the polybutadiene rubber latex may be 85-94% or 86-87%.

The polybutadiene rubber latex may have a mean particle size of 2500-4000 or 2900-3300.

In an embodiment, the methyl methacrylate monomer may be one or more selected from among (meth)acrylic acid methyl ester, (meth)acrylic acid ethyl ester, (meth)acrylic acid propyl ester, (meth)acrylic acid 2-ethylhexyl ester, (meth)acrylic acid decyl ester, and (meth)acrylic acid lauryl ester, and may be present in an amount of 27-36 wt % based on the total weight of the transparent ABS resin.

In an embodiment, the styrene monomer may be one or more selected from among styrene, α-methyl styrene, p-methyl styrene, and vinyl toluene, and may be present in an amount of 10-13 wt % based on the total weight of the transparent ABS resin.

In an embodiment, the acrylonitrile monomer may be one or more selected from among acrylonitrile, methacrylonitrile and ethacrylonitrile, and may be present in an amount of 2-6 wt % based on the total weight of the transparent ABS resin.

In an embodiment, a method for preparing the transparent ABS resin according to the present invention may comprise the steps of: (1) introducing a butadiene monomer in portions to prepare a polybutadiene rubber latex having a gel content of 85-94%; and (2) continuously adding 50-40 wt % of the sum of a methyl methacrylate monomer, a styrene monomer and an acrylonitrile monomer to 50-60 wt % of the polybutadiene rubber latex, and, at the same time, graft-polymerizing the monomers in the presence of a reactive emulsifier and an oil-soluble polymerization initiator to prepare the transparent ABS resin.

In a specific embodiment, step (1) may comprise continuously introducing the butadiene monomer after the degree of conversion of the butadiene monomer reaches 60-80%.

In another embodiment, step (1) may comprise continuously introducing 10-20 parts by weight or 10-15 parts by weight of the butadiene monomer over 10-60 minutes or 15-25 minutes from the time point at which the degree of conversion of the butadiene monomer is 50-60% or 55-60%, elevating the reaction temperature to a temperature between 40° C. and 55° C., and then continuously introducing 40-60 parts by weight or 50-55 parts by weight of the butadiene monomer over 7-9 hours until the degree of conversion of the butadiene monomer reaches 80%.

In an embodiment, the polybutadiene rubber latex may be polybutadiene rubber latex, styrene-butadiene copolymer rubber latex, butadiene-acrylonitrile copolymer rubber latex, ethylene-propylene copolymer rubber latex, or a rubber latex derived from one or more of these latexes.

Step (1) may comprise elevating the reaction temperature to a temperature between 70° C. and 80° C. or between 70° C. and 75° C. at the time point at which the degree of conversion of the butadiene monomer is 80%, thereby reaching a final degree of conversion of 95-99% or 97-98%.

One or more crosslinkers selected from among divinylbenzene, ethylene glycol dimethacrylate, diethylene glycol dimethacrylate, triethylene glycol dimethacrylate, 1,3-butylene glycol dimethacrylate, aryl methacrylate, 1,3-butylene glycol diacrylate, polyethylene glycol (meth)acrylate, polyethylene glycol di(meth)acrylate, and polypropylene glycol di(meth)acrylate, may be introduced in the initial stage of step (1) in an amount of 0.1-5 parts by weight or 0.1-1 part by weight based on 100 parts by weight of the total weight of the butadiene monomer used in step (1).

In an embodiment, the reactive emulsifier may be one or more selected from among sodium dodecyl allyl sulfosuccinate (TREM LF-40), dipotassium $C_{16}$-$C_{18}$ alkenyl succinate (Latemul ASK series), sodium acrylamidostearate (NaAAS), and sodium 3-sulfopropyl tetradodecyl malate (M14), and may be used in an amount of 0.1-2 parts by weight or 0.1-1 part by weight based on 100 parts by weight of the total weight of the latex and monomers used in step (2).

The emulsifier that is used in the present invention can function to maintain the stability of the latex while improving the thermal stability of the latex and the color of the resin.

In an embodiment, the oil-soluble polymerization initiator may be one or more selected from among diisopropylbenzene hydroperoxide, t-hexyl hydroperoxide, 1,1,3,3-tetramethylbutyl hydroperoxide, dicumyl peroxide, t-butylcumyl peroxide, methyl ethyl ketone peroxide, methyl isobutyl ketone peroxide, cyclohexanone peroxide, cumene hydroperoxide, t-butyl hydroperoxide, benzoyl peroxide, lauroyl peroxide, 1,1-di(t-butylperoxy)cyclohexane, 1,1-di(t-butylperoxy)-3,3,5-trimethylcyclohexane, t-butylperoxy benzoate, t-butylperoxy 2-ethyl hexanoate, and bis(4-t-butylcyclohexyl)peroxydicarbonate, and may be used in an amount of 0.01-5 parts by weight or 0.01-1 part by weight based on 100 parts by weight of the total weight of the latex and monomers used in step (2).

The oil-soluble polymerization initiator may be used in combination with one or more activators selected from the group consisting of sodium formaldehyde sulfoxylate, sodium ethylenediamine tetraacetate, ferrous sulfate, dextrose, sodium picolinate, and sodium sulfite.

Unless otherwise specified, an anionic adsorption-type emulsifier selected from among potassium rosinate, fatty acid potassium salt, sodium lauryl sulfonate and sodium alkylbenzene sulfonate, a molecular weight regulator such as t-dodecyl mercaptan, and a reducing agent such as sodium formaldehyde sulfoxylate, may be introduced in amounts that are generally used in the art.

Step (1) may be performed for a total reaction time of 18-20 hours or 18-19 hours.

In the present invention, the swelling index of the polybutadiene rubber latex may be 10-20, 10-18, 14-20, or 16-18. In this swelling index range, absorption of the monomers into the polybutadiene rubber latex can be reduced and the level of occlusion during grafting of monomers onto the polybutadiene rubber latex can be reduced, thus reducing the degree of impregnation of the styrene monomer into the polybutadiene rubber latex.

The prepared transparent ABS is present as latex, and can be recovered as powder through coagulation, dehydration and drying processes. Herein, for coagulation, a salt such as calcium chloride, magnesium sulfate or aluminum sulfate, or an acidic compound such as sulfuric acid, nitric acid or hydrochloric acid, or a mixture thereof, may be used as a coagulating agent.

The transparent ABS resin composition according to the present invention may comprise a transparent ABS resin and a styrene-acrylonitrile (SAN) or methyl methacrylate-styrene-acrylonitrile (MSAN) resin, wherein the transparent ABS resin comprises 50-60 wt % of a polybutadiene rubber latex and 50-40 wt % of the sum of a methyl methacrylate monomer, a styrene monomer and an acrylonitrile monomer, wherein the degree of impregnation of the styrene monomer into the polybutadiene rubber latex is 0.005 or less.

The content of the transparent ABS resin in the composition may be 5-25% or 10-20%.

In an embodiment, the SAN or MSAN resin may be a resin prepared by subjecting 0-75 parts by weight of a (meth)acrylic acid alkyl ester monomer, 10-50 parts by weight of a styrene monomer and 10-20 parts by weight of an acrylonitrile monomer to bulk polymerization, solution polymerization or suspension polymerization.

The composition may further comprise one or more additives selected from among a lubricant, an antioxidant, an antistatic agent, a release agent and a UV stabilizer, depending on the intended use thereof.

Among the additives, the lubricant may be selected from among ethylene bis stearamide, polyethylene oxide wax, metal stearate, and various silicone oils, and may be used in an amount of 0-5 parts by weight, preferably 0.1-2 parts by weight, based on 100 parts by weight of the thermoplastic resin composition.

The transparent ABS resin composition may be kneaded, thereby providing a thermoplastic transparent resin. Specifically, the composition is uniformly dispersed using a single-screw extruder, a twin-screw extruder or a Banbury mixer. The dispersed composition is passed through a water bath and cut to yield a pellet-type transparent resin.

The transparent thermoplastic resin according to the present invention is prepared by extruding and injection-molding the above-described transparent ABS resin composition, and may have a light transmittance of 90.5 or higher as measured on a 3 mm thick sheet in accordance with ASTM D1003, a haze value of 2.0 or less as measured on a 3 mm thick sheet in accordance with ASTM D1003, and an Izod impact strength of 15 or more as measured in accordance with ASTM D256 (¼").

Advantageous Effects

As apparent from the foregoing, the present invention advantageously provides a transparent ABS resin and a transparent ABS resin composition, which have excellent transparency and impact resistance as a result of minimizing the degree of impregnation of a styrene monomer into a polybutadiene rubber latex while allowing the styrene monomer to constitute a graft shell to thereby effectively form the graft shell.

Particularly, the present invention can provide a transparent ABS resin composition having high transparency and impact resistance, despite applying a reducing agent and Fe ions, which adversely affected the transparency of ABS resins in the prior art, to ABS resin.

BEST MODE

Hereinafter, preferred examples will be described for a better understanding of the present invention. It is to be understood, however, that these examples are for illustrative purposes only and are not intended to limit the scope of the present invention.

PREPARATION EXAMPLE 1

Preparation of Polybutadiene Rubber Latex (A-1)

50 parts by weight of deionized water was introduced a polymerization reactor (autoclave) under a nitrogen atmosphere, and then 0.8 parts by weight of fatty acid potassium salt, 1.0 part by weight of potassium rosinate and 1.0 parts by weight of potassium carbonate were introduced into the reactor at room temperature and stirred. Subsequently, 30 parts by weight of 1,3-butadiene, 0.3 parts by weight of t-dodecyl mercaptan, 0.8 parts by weight of polyethylene glycol diacrylate and 0.3 parts by weight of diisopropylbenzene hydroperoxide were introduced into the reactor, after which the internal temperature of the reactor was elevated to 40° C., and the contents of the reactor were allowed to react at that temperature for 6 hours. When the degree of conversion of the 1,3-butadiene reached 60%, 15 parts of 1,3-butadiene was additionally introduced into the reactor over 20 minutes, and then the internal temperature of the reactor was elevated to 55° C.

Thereafter, 55 parts by weight of 1,3-butadiene was continuously introduced into the reactor over 8 hours, and when the degree of conversion of the 1,3-butadiene reached 80%, the internal temperature of the reactor was elevated to 75° C.

Herein, an emulsion comprising 4 parts by weight of deionized water, 0.5 parts by weight of potassium rosinate and 0.3 parts by weight of t-butyl hydroperoxide was introduced into the reactor over 6 hours from the time point at which continuous introduction of the butadiene was started. Subsequently, 0.0003 parts by weight of ferrous sulfate, 0.05 parts by weight of dextrose, 0.04 parts by weight of sodium pyrophosphate and 0.3 parts by weight of t-butyl hydroperoxide were further introduced into the reactor, and the contents in the reactor were allowed to react for 4 hours, followed by termination of the reaction.

PREPARATION EXAMPLE 2

Preparation of Polybutadiene Rubber Latex (A-2)

50 parts by weight of deionized water was introduced into a polymerization reactor (autoclave) under a nitrogen atmosphere, and then 0.8 parts by weight of fatty acid potassium salt, 1.0 part by weight of potassium rosinate and 1.0 part by weight of potassium carbonate were introduced into the reactor at room temperature and stirred. Subsequently, 40 parts by weight of 1,3-butadiene, 0.3 parts by weight of t-dodecyl mercaptan, 0.8 parts by weight of polyethylene glycol diacrylate and 0.3 parts by weight of diisopropylbenzene hydroperoxide were introduced into the reactor, after which the internal temperature of the reactor was elevated to 40° C., and the contents in the reactor were allowed to react at that temperature for 6 hours. When the degree of conversion of the 1,3-butadiene reached 60%, 15 parts of 1,3-butadiene was additionally introduced into the reactor over 20 minutes, and then the internal temperature of the reactor was elevated to 55° C. Thereafter, 45 parts by weight of 1,3-butadiene was continuously introduced into the reactor over 8 hours, and when the degree of conversion of the 1,3-butadiene reached 80%, the internal temperature of the reactor was elevated to 75° C. Herein, an emulsion comprising 4 parts by weight of deionized water, 0.5 parts by weight of potassium rosinate and 0.3 parts by weight of t-butyl hydroperoxide was introduced into the reactor over 6 hours from the time point at which continuous introduction of the butadiene was started. Subsequently, 0.0003 parts by weight of ferrous sulfate, 0.05 parts by weight of dextrose, 0.04 parts by weight of sodium pyrophosphate and 0.3 parts by weight of t-butyl hydroperoxide were further introduced into the reactor, and the contents in the reactor were allowed to react for 4 hours, followed by termination of the reaction.

PREPARATION EXAMPLE 3

Preparation of Polybutadiene Rubber Latex (A-3)

50 parts by weight of deionized water was introduced into a polymerization reactor (autoclave) under a nitrogen atmosphere, and then 0.8 parts by weight of fatty acid potassium salt, 1.0 part by weight of potassium rosinate and 1.0 part by weight of potassium carbonate were introduced into the reactor at room temperature and stirred. Subsequently, 40 parts by weight of 1,3-butadiene, 0.3 parts by weight of t-dodecyl mercaptan and 0.3 parts by weight of potassium persulfate were introduced all at once into the reactor, after which the internal temperature of the reactor was elevated to 70° C., and the contents of the reactor were allowed to react at that temperature for 7 hours. When the degree of conversion of the 1,3-butadiene reached 60%, 30 parts by weight of 1,3-butadiene, 0.5 parts by weight of potassium rosinate and 0.2 parts by weight of potassium persulfate were introduced all at once into the reactor, followed by reaction for 7 hours. Next, 30 parts by weight of 1,3-butadiene, 0.5 parts by weight of potassium rosinate and 0.2 parts by weight of potassium persulfate were introduced all at once into the reactor, and the 1,3-butadiene was further polymerized for 4 hours while the internal temperature of the reactor was elevated to 80° C. When the degree of conversion of the 1,3-butadiene reached 85%, 4 parts by weight of deionized water, 0.5 parts by weight of potassium rosinate and 0.2 parts by weight of potassium persulfate were introduced into the reactor, and then the contents of the reactors were allowed to react at 80° C. for 4 hours, followed by termination of the reaction.

The degree of conversion of 1,3-butadiene to the polybutadiene rubber latex in each of Preparation Examples 1 to 3, the gel content, mean particle size and swelling index of the polybutadiene rubber latex, and the reaction time in each of Preparation Examples 1 to 3, are summarized in Table 1 below.

For reference, the gel content and swelling index of the polybutadiene rubber latex prepared in each of Preparation Examples 1 to 3 were measured by coagulating the polybutadiene rubber latex with a dilute acid or a metal salt, washing the coagulated latex, drying the washed latex in a vacuum oven at 60° C. for 24 hours, cutting the resulting rubber mass finely with scissors, placing 1 g of the rubber pieces in 100 g of toluene, storing the rubber solution in a dark room at room temperature for 48 hours to separate the same into sol and gel, and calculating the gel content and the swelling index using the following equations:

Gel content (%)=weight of insoluble matter (gel)/weight of sample×100

Swelling index=weight of swollen gel/weight of gel

TABLE 1

| | Preparation Example 1 | Preparation Example 2 | Preparation Example 3 |
|---|---|---|---|
| Degree (%) of conversion to polymer | 98 | 97 | 90 |
| Gel content (%) | 87 | 86 | 80 |
| Mean particle size ( ) | 3200 | 3100 | 2900 |
| Reaction time (hr) | 18 | 18 | 22 |
| Swelling index | 16 | 18 | 26 |

As can be seen in Table 1 above, in Preparation Examples 1 and 2 according to the present invention, a large-size polybutadiene rubber latex having a high degree of conversion and a high gel content could be obtained by effectively controlling the particle size and the polymerization temperature within a short reaction time compared to that of Preparation Example 3 as a prior art method.

Particularly, from the swelling indices of the polybutadiene rubber latexes of Preparation Examples 1 and 2, which are lower than that of the polybutadiene rubber latex of Preparation Examples 3, it can be seen that the absorption of monomers into the polybutadiene rubber latexes of Preparation Examples 1 and 2 and the level of occlusion during grafting of monomers onto the polybutadiene rubber latexes are lower, indicating that the degree of impregnation of styrene into the polybutadiene rubber latexes is also lower.

Using the polybutadiene rubber latexes prepared in Preparation Examples 1 to 3, transparent ABS resins of Examples 1 to 4 and Comparative Examples 1 to 3 were prepared in the following manner.

EXAMPLE 1

Preparation of Transparent ABS Resin (B-1)

100 parts by weight of deionized water, 0.5 parts by weight of dipotassium $C_{16}$-$C_{18}$ alkenyl succinate (Latemul ASK, Latemul ASK series) as a reactive emulsifier, 34 parts by weight of methyl methacrylate, 13 parts by weight of styrene, 3 parts by weight of acrylonitrile, 0.5 parts by weight of t-dodecyl mercaptan, 0.048 parts by weight of sodium formaldehyde sulfoxylate, 0.012 parts by weight of sodium ethylene diamine tetraacetate, 0.001 parts by weight of ferrous sulfate and 0.04 parts by weight of t-butyl hydroperoxide were continuously added to the polybutadiene rubber latex of Preparation Example 1 at 75° C. for 5 hours while the mixture was allowed to react. After reaction, the reaction mixture was heated to 80° C., and then allowed to stand at that temperature for 1 hour, followed by termination of the reaction.

EXAMPLE 2

Preparation of Transparent ABS Resin (B-2)

The process of Example 1 was repeated, except that 30 parts by weight of methyl methacrylate, 12 parts by weight of styrene and 3 parts by weight of acrylonitrile were added to 55 parts by weight of the polybutadiene rubber latex of Preparation Example 1.

EXAMPLE 3

Preparation of Transparent ABS Resin (B-3)

The process of Example 1 was repeated, except that 27 parts by weight of methyl methacrylate, 10 parts by weight of styrene and 3 parts by weight of acrylonitrile were added to 60 parts by weight of the polybutadiene rubber latex of Preparation Example 1.

EXAMPLE 4

Preparation of Transparent ABS Resin (B-4)

The process of Example 1 was repeated, except that 34 parts by weight of methyl methacrylate, 13 parts by weight of styrene and 3 parts by weight of acrylonitrile were added to 50 parts by weight of the polybutadiene rubber latex of Preparation Example 2.

COMPARATIVE EXAMPLE 1

Preparation of Transparent ABS Resin Latex (B-5)

The process of Example 1 was repeated, except that 34 parts by weight of methyl methacrylate, 13 parts by weight of styrene and 3 parts by weight of acrylonitrile were added to 50 parts by weight of the polybutadiene rubber latex of Preparation Example 3.

COMPARATIVE EXAMPLE 2

Preparation of Transparent ABS Resin Latex (B-6)

The process of Example 1 was repeated, except that 30 parts by weight of methyl methacrylate, 12 parts by weight of styrene and 3 parts by weight of acrylonitrile were added to 55 parts by weight of the polybutadiene rubber latex of Preparation Example 3.

COMPARATIVE EXAMPLE 3

Preparation of Transparent ABS Resin Latex (B-7)

The process of Example 1 was repeated, except that 27 parts by weight of methyl methacrylate, 10 parts by weight of styrene and 3 parts by weight of acrylonitrile were added to 60 parts by weight of the polybutadiene rubber latex of Preparation Example 3.

Each of the transparent ABS resin latexes prepared in Examples 1 to 4 and Comparative Examples 1 to 3 was coagulated and dried to yield powder which was then mixed with methyl methacrylate-styrene-acrylonitrile (MSAN) (XT500, manufactured by LG Chemical Co., Ltd.) so as to have a rubber content of 15%. Next, 0.3 parts by weight of a lubricant and 0.2 parts by weight of an antioxidant were added to each of the mixtures which were then kneaded using a twin-screw extrusion kneader at a cylinder temperature of 210° C., thereby preparing pellet-type thermoplastic transparent resins.

The prepared pellets were injection-molded to prepare mm thick specimens. The physical properties of the specimens were measured in the following manner, and the results of the measurement are shown in Table 2 below.

Evaluation of Physical Properties

1. Transparency (haze): measured in accordance with ASTM D1003.
2. Transmittance (Tt): measured in accordance with ASTM D1003.
3. Notched Izod impact strength: measured on a ¼" specimen in accordance with ASTM D256.

TABLE 2

|  | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Polybutadiene rubber latex | A-1 | A-1 | A-1 | A-2 | A-3 | A-3 | A-3 |
| Amount (wt %) of polybutadiene rubber latex used | 50 | 55 | 60 | 50 | 50 | 55 | 60 |
| Haze | 1.5 | 1.6 | 1.6 | 1.5 | 2.2 | 2.5 | 3.4 |
| Transmittance | 90.8 | 90.6 | 90.6 | 90.7 | 90.0 | 89.9 | 89.9 |
| Impact strength | 17 | 16 | 16 | 17 | 13 | 12 | 10 |

As can be seen in Table 2 above, Examples 1 to 4 of the present invention made it possible to prepare the thermoplastic transparent resin having excellent transparency and impact resistance by minimizing the degree of impregnation of the styrene monomer into the polybutadiene rubber latex while allowing the styrene monomer to constitute the graft shell to thereby effectively form the graft shell, unlike Comparative Examples 1 to 3. In addition, it can be seen that the thermoplastic transparent resins prepared in Examples 1 to 4 had a light transmittance of 90.5 or higher as measured on the 3 mm thick sheet at room temperature in accordance with ASTM D1003, a have value of 2.0 or less as measured on the 3 mm thick sheet at room temperature in accordance with ASTM D1003, and an Izod impact strength of 15 or higher as measured in accordance with ASTM D256 (¼").

What is claimed is:

1. A transparent acrylonitrile-butadiene-styrene (ABS) resin comprising:
    50-60 wt % of a polybutadiene rubber latex; and
    50-40 wt % of a sum of a first monomer including methyl methacrylate, a second monomer including styrene, and a third monomer including acrylonitrile,
    wherein a degree of impregnation of the second monomer into the polybutadiene rubber latex is 0.005 or less.
2. The transparent ABS resin of claim 1, wherein the polybutadiene rubber latex has a swelling index of 10-20, wherein the swelling index corresponds to a 1 g piece of the polybutadiene rubber latex soaked in 100 g of toluene for 48 hours at room temperature.
3. The transparent ABS resin of claim 1, wherein the polybutadiene rubber latex has a gel content of 85-94%.
4. The transparent ABS resin of claim 1, wherein the polybutadiene rubber latex has a mean particle size of 2500-4000Å.

5. The transparent ABS resin of claim 1, wherein the first monomer further includes one or more selected from (meth) acrylic acid methyl ester, (meth)acrylic acid ethyl ester, (meth)acrylic acid propyl ester, (meth)acrylic acid 2-ethylhexyl ester, (meth)acrylic acid decyl ester, and (meth)acrylic acid lauryl ester, the first monomer being present in an amount of 27-36 wt% based on the total weight of the transparent ABS resin.

6. The transparent ABS resin of claim 1, wherein the second monomer further includes one or more selected from α-methyl styrene, p-methyl styrene, and vinyl toluene, the second monomer being present in an amount of 10-13 wt % based on the total weight of the transparent ABS resin.

7. The transparent ABS resin of claim 1, wherein the third monomer further includes one or more selected from methacrylonitrile and ethacrylonitrile, the acrylonitrile monomer being present in an amount of 2-6 wt % based on the total weight of the transparent ABS resin.

8. A method for preparing the transparent ABS resin, the method comprising:
preparing a polybutadiene rubber latex having a gel content of 85-94% by introducing a butadiene monomer in portions; and
preparing the transparent ABS resin by simultaneously continuously adding 50-40 wt % of a sum of a methyl methacrylate monomer, a styrene monomer, and an acrylonitrile monomer to 50-60 wt % of the polybutadiene rubber latex, and graft-polymerizing the monomers in the presence of a reactive emulsifier and an oil-soluble polymerization initiator,
wherein a degree of impregnation of the styrene monomer into the polybutadiene rubber latex is 0.005 or less.

9. The method of claim 8, wherein preparing the polybutadiene rubber latex comprises continuously introducing the butadiene monomer after a degree of conversion of the butadiene monomer reaches 60-80%.

10. The method of claim 9, wherein the temperature of the butadiene monomer is elevated to 75° C. at a time point at which the degree of conversion of the butadiene monomer is 80%, and a final degree of conversion of the butadiene monomer is 95-99%.

11. The method of claim 8, wherein preparing the polybutadiene rubber latex comprises continuously introducing 10-20 parts by weight of the butadiene monomer over 20 minutes from a time point at which a degree of conversion of the butadiene monomer is 50-60%, elevating a temperature of the butadiene monomer to a temperature between 40° C. and 55° C., and then continuously introducing 40-60 parts by weight of the butadiene monomer over 7-9 hours until the degree of conversion of the butadiene monomer reaches 80%.

12. The method of claim 8, wherein an initial stage of preparing the polybutadiene rubber latex includes adding one or more crosslinkers in an amount of 0.1-5 parts by weight based on 100 parts by weight of the total weight of the butadiene monomer, the one or more crosslinkers being selected from divinylbenzene, ethylene glycol dimethacrylate, diethylene glycol dimethacrylate, triethylene glycol dimethacrylate, 1,3-butylene glycol dimethacrylate, aryl methacrylate, 1,3-butylene glycol diacrylate, polyethylene glycol (meth)acrylate, polyethylene glycol di(meth)acrylate, and polypropylene glycol di(meth)acrylate.

13. The method of claim 8, wherein the reactive emulsifier includes one or more selected from sodium dodecyl allyl sulfosuccinate, dipotassium C16-C18 alkenyl succinate, sodium acrylamidostearate (NaAAS), and sodium 3-sulfopropyl tetradodecyl malate, the reactive emulsifier being used in an amount of 0.1-2 parts by weight based on 100 parts by weight of the total weight of the latex and the monomers.

14. The method of claim 8, wherein the oil-soluble polymerization initiator includes one or more selected from among diisopropylbenzene hydroperoxide, t-hexyl hydroperoxide, 1,1,3,3-tetramethylbutyl hydroperoxide, dicumyl peroxide, t-butylcumyl peroxide, methyl ethyl ketone peroxide, methyl isobutyl ketone peroxide, cyclohexanone peroxide, cumene hydroperoxide, t-butyl hydroperoxide, benzoyl peroxide, lauroyl peroxide, 1,1-di(t-butylperoxy) cyclohexane, 1,1-di(t-butylperoxy)-3,3,5-trimethylcyclohexane, t-butylperoxy benzoate, t-butylperoxy 2-ethyl hexanoate, and bis(4-t- butylcyclohexyl)peroxydicarbonate, the oil-soluble polymerization initiator being used in an amount of 0.01-5 parts by weight based on 100 parts by weight of the total weight of the latex and the monomers.

15. The method of claim 8, wherein the polybutadiene rubber latex prepared for a total reaction time of 18-20 hours.

16. A transparent acrylonitrile-butadiene-styrene (ABS) resin composition comprising:
a transparent ABS resin; and
a styrene-acrylonitrile (SAN) or methyl methacrylate-styrene-acrylonitrile (MSAN) resin,
wherein the transparent ABS resin comprises 50-60 wt% of a polybutadiene rubber latex and 50-40 wt% of a sum of a methyl methacrylate monomer, a styrene monomer, and an acrylonitrile monomer,
wherein a degree of impregnation of the styrene monomer into the polybutadiene rubber latex is 0.005 or less.

17. The transparent ABS resin composition of claim 16, wherein the polybutadiene rubber latex has a swelling index of 10-20,
wherein the swelling index corresponds to a 1 g piece of the polybutadiene rubber latex soaked in 100 g of toluene for 48 hours at room temperature.

18. The transparent ABS resin composition of claim 16, wherein a content of the transparent ABS resin in the ABS resin composition is 5-25 wt %.

19. The transparent ABS resin composition of claim 16, wherein the SAN or MSAN resin is prepared by subjecting 0-75 parts by weight of a (meth)acrylic acid alkyl ester monomer, 10-50 parts by weight of a styrene monomer, and 10-20parts by weight of an acrylonitrile monomer to bulk polymerization, solution polymerization, or suspension polymerization.

20. A thermoplastic transparent resin that is prepared by extruding and injection-molding the transparent ABS resin composition of claim 16,
wherein a 3 mm thick sheet of the thermoplastic transparent resin at room temperature has a light transmittance of 90.5 or higher in accordance with ASTM D1003, and a haze value of 2.0 or less in accordance with ASTM D1003, and
wherein the thermoplastic transparent resin has an Izod impact strength of 15 or higher as measured in accordance with ASTM D256 (¼").

* * * * *